United States Patent
Chang (10) Patent No.: US 6,308,754 B1
(45) Date of Patent: Oct. 30, 2001

(54) THICKNESS-INDICATING DEVICE FOR A WOOD-PLANING MACHINE

(75) Inventor: Chiu-Tsun Chang, Taichung (TW)

(73) Assignee: P&F Brother Industrial Corporation, Taichung (TW)

( * ) Notice: Subject to any disclaimer, the term of this patent is extended or adjusted under 35 U.S.C. 154(b) by 0 days.

(21) Appl. No.: 09/821,647

(22) Filed: Mar. 29, 2001

(51) Int. Cl.$^7$ ................................. B27C 1/02; B23C 1/12
(52) U.S. Cl. .................. 144/117.1; 144/130; 83/522.19; 409/210; 409/214
(58) Field of Search ............................. 83/522.1, 522.15, 83/522.16, 522.17, 522.19; 144/114.1, 116, 117, 129, 130; 409/210, 214

(56) References Cited

U.S. PATENT DOCUMENTS

| | | | |
|---|---|---|---|
| 5,795,113 | * 8/1998 | Wixey et al. ................. | 144/117.1 X |
| 5,967,205 | * 10/1999 | Welsh et al. ..................... | 144/117.1 |
| 6,262,839 | * 7/2001 | Wixey et al. ................. | 83/522.19 X |

* cited by examiner

Primary Examiner—W Donald Bray
(74) Attorney, Agent, or Firm—Trop, Pruner & Hu, P.C.

(57) ABSTRACT

A thickness-indicating device for a wood-planing machine includes a mounting member, a pointer, a vertical pushing rod, a resilient member, and a scale member. The mounting member is adapted to be disposed fixedly on the cutter seat. The pointer has a connecting end that is mounted pivotally on the mounting member, an indicator end that is rotatable about the connecting end, and an abutment portion that is located between the connecting end and the indicator end. The pushing rod is disposed vertically and movably on the mounting member, and has an upper end which abuts against the abutment portion of the pointer, and a lower end which is adapted to abut against a top surface of a workpiece that is held on the machine. The resilient member is adapted to bias a lower end of the pushing rod to abut against the workpiece. The scale member is disposed fixedly on the mounting member near the indicator end of the pointer.

8 Claims, 7 Drawing Sheets

THICKNESS-INDICATING DEVICE FOR A WOOD-PLANING MACHINE

BACKGROUND OF THE INVENTION

1. Field of the Invention

This invention relates to a wood-planing machine, more particularly to a thickness-indicating device for a wood-planing machine, which indicates the thickness of a workpiece to be cut.

2. Description of the Related Art

Figure 1:
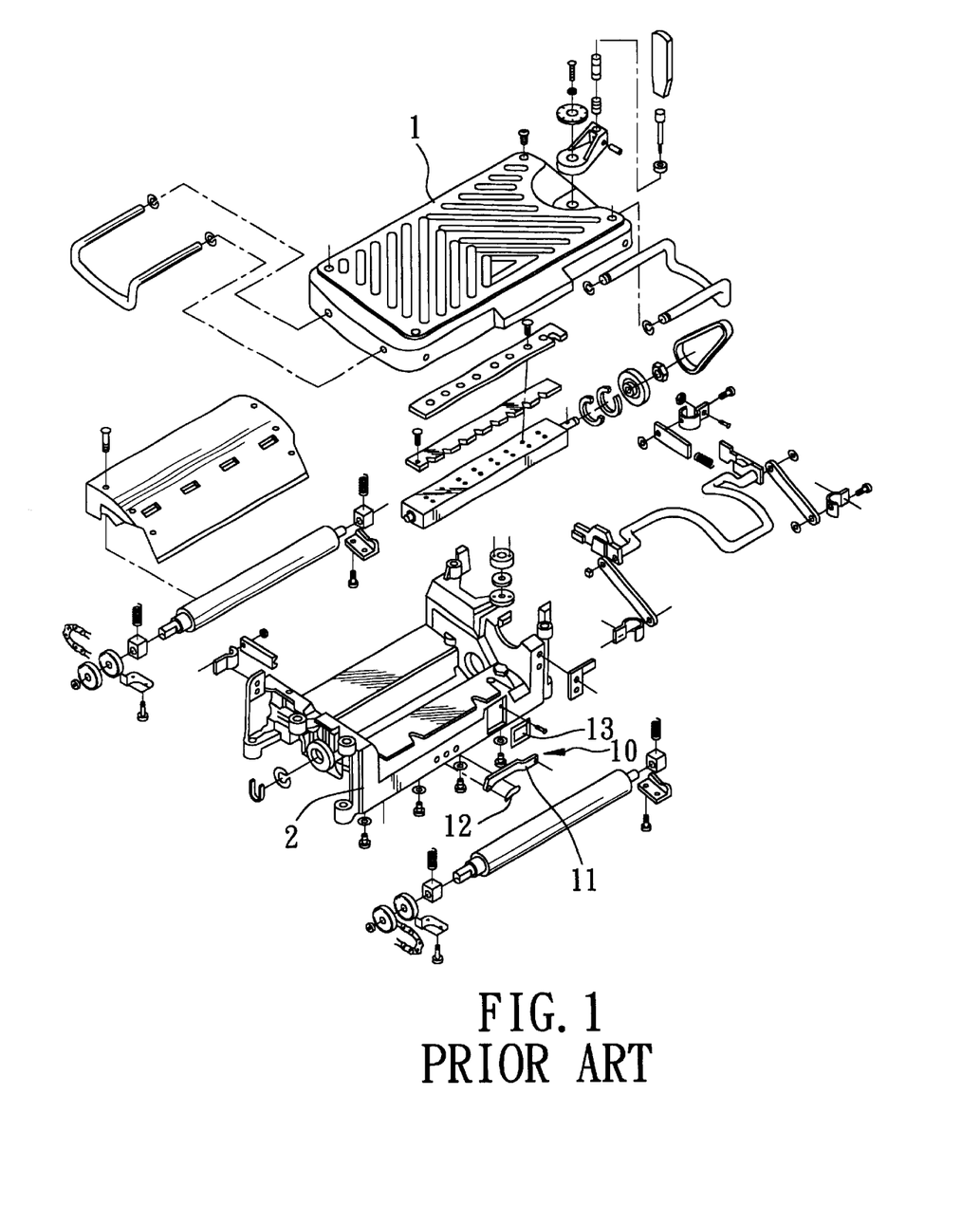
FIG. 1 is an exploded view of a portion of a woodplaning machine, which is provided with a conventional thickness-indicating device.
Figure 2:
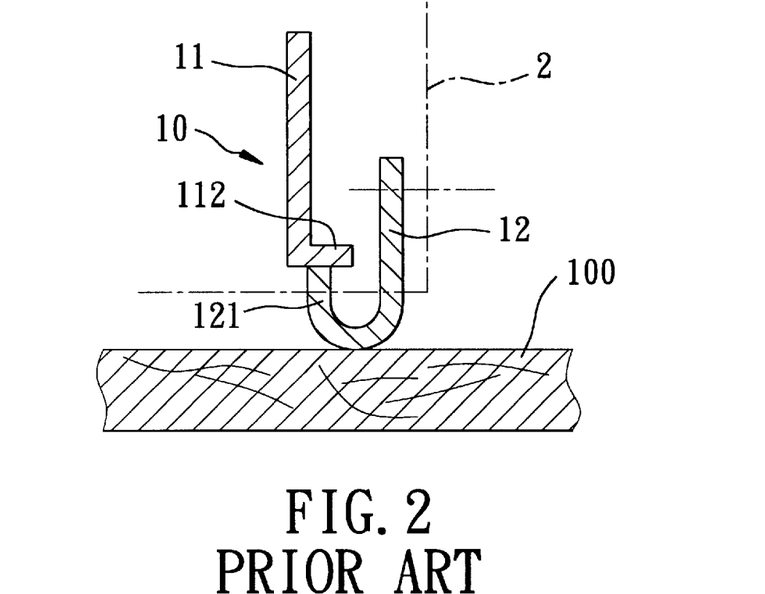
FIG. 2 is a sectional side view of a pointer and a reed spring of the conventional thickness-indicating device shown in FIG. 1.
Figure 3:
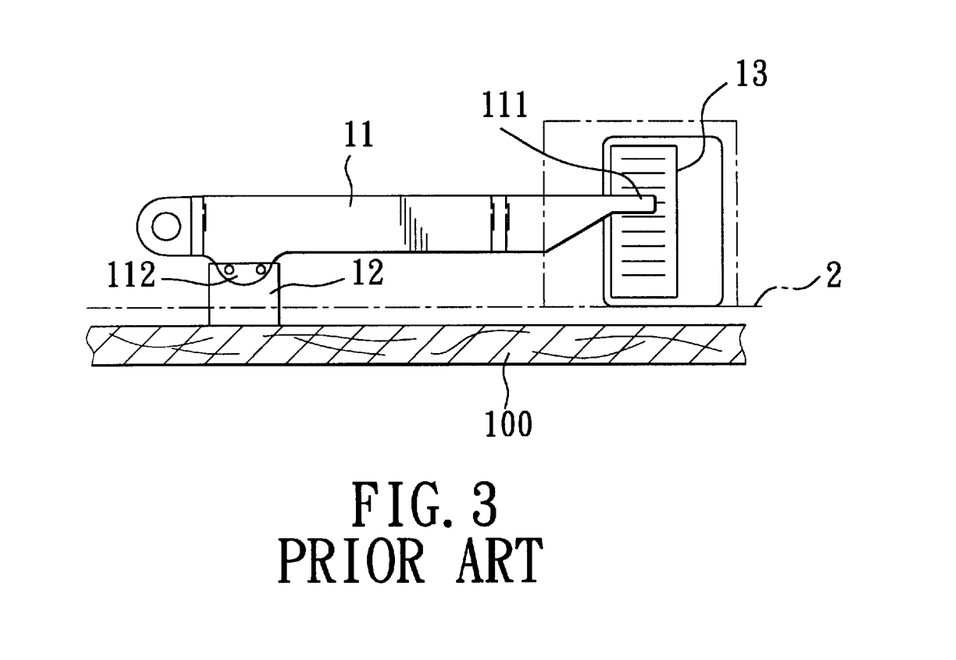
FIG. 3 is a partly sectional front view of the conventional thickness-indicating device shown in FIG.

Referring to FIGS. 1, 2 and 3, a conventional wood-planing machine is shown to include a machine bed 1 (only a portion thereof is shown in FIG. 1), and a cutter seat 2 disposed vertically and movably on the machine bed 1. A thickness-indicating device 10 includes a rotatable pointer 11, a reed spring 12 fixed on the cutter seat 2, and a scale member 13. When it is desired to cut a workpiece 100 that is held on the machine, the cutter seat 2 is moved toward the workpiece 100. During downward movement of the cutter seat 2, a curved end 121 of the reed spring 12 presses against the workpiece 100 so as to deform, thereby pushing upward a nose 112 of the pointer 11. A free end 111 of the pointer 11 is thus turned upward, thereby indicating the thickness of the workpiece 100 to be cut. The conventional thickness-indicating device 10 suffers from the following disadvantage:

(1) A linear contact is present between the reed spring 12 and the workpiece 100, thereby hindering smooth movement of the workpiece 100 between the reed spring 12 and the machine bed 1, which is performed in order to change the portion of the top surface of the workpiece 100 to be cut.

(2) Because the engaging surface area between the reed spring 12 and the workpiece 100 is relatively large, and because the vibration resulting from cutting of the workpiece 100 is transmitted to the reed spring 12, the reed spring 12 easily experiences spring fatigue.

(3) Due to the linear engagement between the reed spring 12 and the workpiece 100, there is a need to exert a relatively large force to depress the cutter seat 2 for deforming the curved end 121 of the reed spring 12. In a case where the workpiece 100 has a somewhat soft top surface to be cut, a shallow slot (not shown) will be formed in the soft top surface. As such, it is difficult for the pointer 11 to indicate accurately the thickness of the workpiece 100 to be cut. Furthermore, the engagement between the curved end 121 of the reed spring 12 and the shallow slot will prevent movement of the workpiece 100 between the reed spring 12 and the machine bed 1.

SUMMARY OF THE INVENTION

An object of this invention is to provide a woodplaning machine with a thickness-indicating device, which has a relatively small engaging surface area that contacts a workpiece to be cut, thereby enabling smooth movement of the workpiece relative to the device and accurate indication of the device.

According to this invention, a thickness-indicating device for a wood-planing machine includes a mounting member, a pointer, a vertical pushing rod, a resilient member, and a scale member. The mounting member is adapted to be disposed fixedly on the cutter seat. The pointer has a connecting end that is mounted pivotally on the mounting member, an indicator end that is rotatable about the connecting end, and an abutment portion that is located between the connecting end and the indicator end. The pushing rod is disposed vertically and movably on the mounting member, and has an upper end which abuts against the abutment portion of the pointer, and a lower end which is adapted to abut against a top surface of a workpiece that is held on the machine. The resilient member is adapted to bias a lower end of the pushing rod to abut against the workpiece. The scale member is disposed fixedly on the mounting member near the indicator end of the pointer. Accordingly, when the cutter seat and the mounting member move downward toward the workpiece, the pushing rod cannot move relative to the workpiece so as to rotate the pointer relative to the mounting member and the scale member, thereby indicating the thickness of the workpiece to be cut. Because the engaging surface area between the pushing rod and the workpiece is relatively small, the workpiece can be moved smoothly relative to the pushing rod. Furthermore, formation of any slot or groove in a top surface of the workpiece can be prevented due to the reduction in the engaging surface area.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Referring to FIGS. 4, 4A, 4B, 5 and 6, the preferred embodiment of a thickness-indicating device 30 for a wood-planing machine is shown to include a mounting member 31, a pointer 32, a vertical pushing rod 33, a scale member 34, a stepped washer 351, a headed bolt 352, and a resilient member 36.

The mounting member 31 is adapted to be disposed fixedly on a vertically movable cutter seat 20 of the wood-planing machine.

The pointer 32 has a connecting end 321 that is mounted pivotally on the mounting member 31, an indicator end 322 that is rotatable about the connecting end 321, and a downwardly projecting abutment portion 324 that is located between the connecting end 321 and the indicator end 322.

The pushing rod 33 is disposed vertically and movably on the mounting member 31, and has an upper end which abuts against the abutment portion 324 of the pointer 32, and a lower end 331 which is adapted to abut against a top surface of a workpiece 100' that is to be cut and that is held on the machine.

The resilient member 36 is adapted to bias the lower end 331 of the pushing rod 33 to abut against the workpiece 100'.

The scale member 34 is disposed fixedly on the mounting member 31 near the indicator end 322 of the pointer 32.

Figure 7:
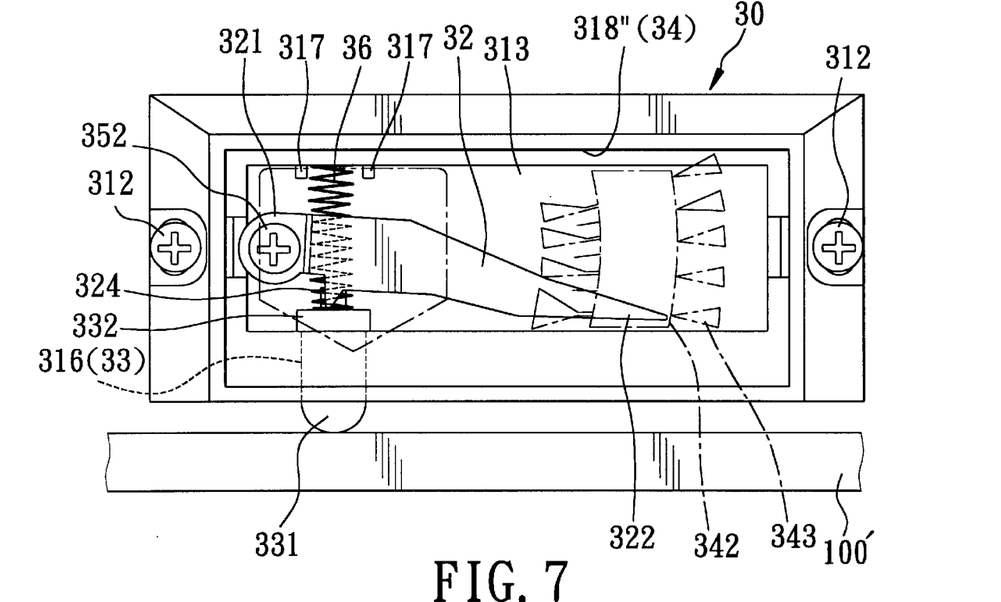
FIG. 7 is a schematic front view, illustrating how an indicator end of a pointer of the preferred embodiment is disposed at its lower limit position.
Figure 8:
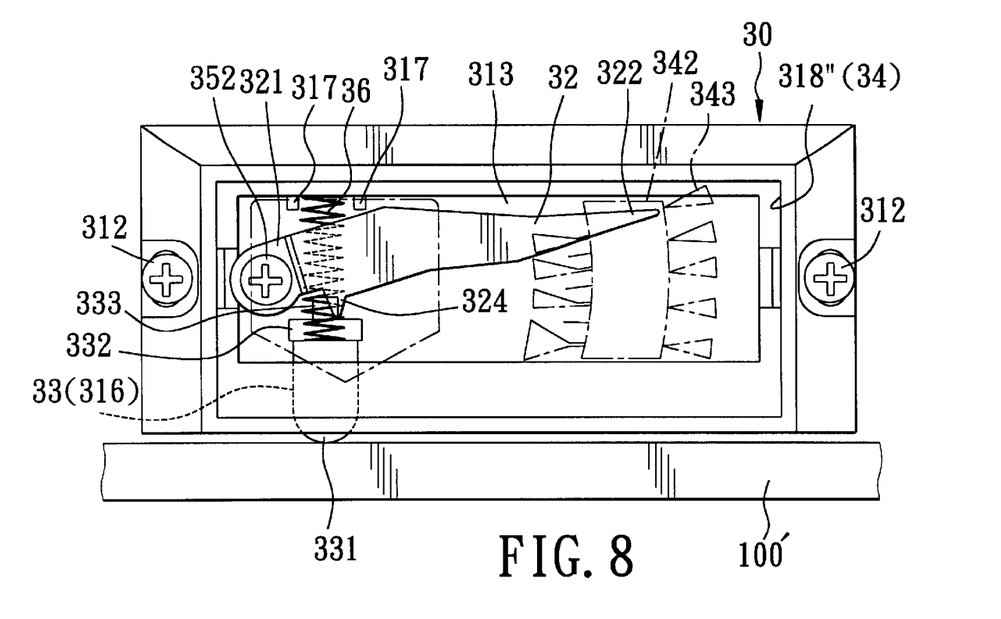
FIG. 8 is a schematic front view, illustrating how the indicator end of a pointer of the preferred embodiment is turned to its upper limit position.

When the cutter seat 20 and the mounting member 31 move downward toward the workpiece 100', the pushing rod 31 cannot move relative to the workpiece 100' so as to rotate the pointer 32 relative to the mounting member 31 and the scale member 34 from the normal position shown in FIG. 7 to that shown in FIG. 8, thereby indicating the thickness of the workpiece 100' to be cut.

In this embodiment, because the lower end 331 of the pushing rod 33 is generally hemispherical, the engaging surface area between the pushing rod 33 and the workpiece 100' is relatively small. Accordingly, the workpiece 100' can be moved smoothly relative to the pushing rod 33.

The mounting member 31 is disposed within a recess 21 in the cutter seat 20, and is constructed as a rectangular frame, which has two side posts 310, an upper rail 310' having two ends that are connected respectively and fixedly to upper ends of the posts 310, and a lower rail 310" having two ends that are connected respectively and fixedly to lower ends of the posts 310 so as to define a rectangular hole 313 between the posts 310 and between the upper and lower rails 310', 310". Each of the posts 310 is formed with a horizontal hole 311. Two bolts 312 extend through the horizontal holes 311, respectively, to engage threaded holes 22 in the cutter seat 20, thereby fixing the mounting member 31 to the cutter seat 20.

The pointer 32 is disposed within the rectangular hole 313. The left post 310 is formed with an integral lug 314, which is located in the rectangular hole 313 in the mounting member 31 and which has a threaded hole 315. The headed bolt 352 extends through the washer 351 to engage the threaded hole 315 in the lug 314 of the mounting member 31. The washer 351 has a large-diameter washer portion 351' which is proximate to the lug 314, and a small-diameter washer portion 351" which is distal to the lug 314 and which has an outer diameter smaller than that of the large-diameter washer portion 351'. The connecting end 321 of the pointer 32 is formed with a hole 323 therethrough, which engages the small-diameter washer portion 351" so as to confine the pointer 32 between the large-diameter washer portion 351' and the head of the bolt 352, thereby connecting the pointer 32 rotatably to the mounting member 31.

The scale member 34 is shaped as a vertical rectangular plate, which is mounted removably on the mounting member 31 and which covers the rectangular hole 313 in the mounting member 31. The scale member 34 has a curved slot 342 formed therethrough, through which the indicator end 322 of the pointer 32 is visible, and an outer surface that is formed with a thickness-indicating mark unit 343. The indicator end 322 of the pointer 32 is directed toward the mark unit 343.

The mounting member 31 has a vertical rearward face 317' (see FIG. 4B), an inverted U-shaped upper flange 318 that extends inward from the upper rail 310' and the upper portions of the posts 310, and a U-shaped lower flange 318' that extends inward from the lower rail 310" and the lower portions of the posts 310 and that is disposed under the upper flange 318. As such, a rectangular chamber 318 is formed in the mounting member 30 in front of the upper and lower flanges 318, 318' for receiving the scale member 34 therewithin. Two notches 319 are defined between the ends of the upper and lower flanges 318, 318'. The scale member 34 abuts against the upper and lower flanges 318, 318', and has an inner side surface, which is formed with two retaining barbs 341 on two opposite sides that extend respectively through the notches 319. The barbs 341 have bent end portions that extend away from each other and that abut against the vertical rearward face 317' of the mounting member 31 so as to retain the scale member 34 on the upper and lower flanges 318, 318', thereby confining the scale member 34 within the rectangular hole 313 in the mounting member 31.

The lower rail 310" of the mounting member 31 is formed with a vertical rod hole 316 therethrough, through which the pushing rod 33 extends. The pushing rod 33 has an upper end, which is formed with an integral outward flange 332 that extends radially and outwardly therefrom and that has a diameter larger than that of the rod hole 316 in the lower rail 310" for preventing downward removal of the pushing rod 33 from the rod hole 316 in the lower rail 310". The resilient member 36 is constructed as a coiled compression spring, which is confined between the pushing rod 33 and the upper rail 310' so as to bias the pushing rod 33 away from the upper rail 310'.

Figure 4:
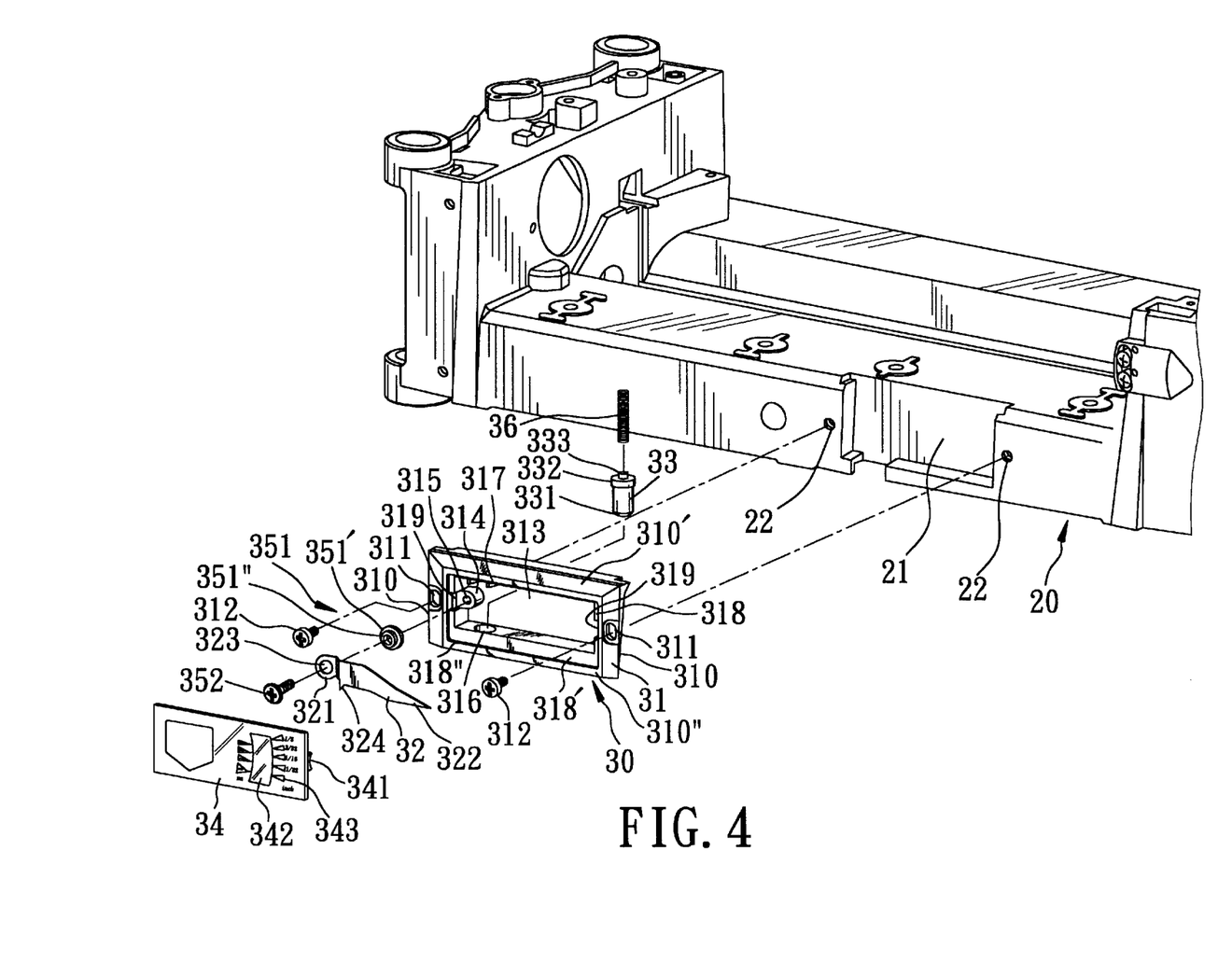
FIG. 4 is a fragmentary perspective view of a wood-planing machine, which is provided with the preferred embodiment of a thickness-indicating device according to this invention.
Figure 4A:
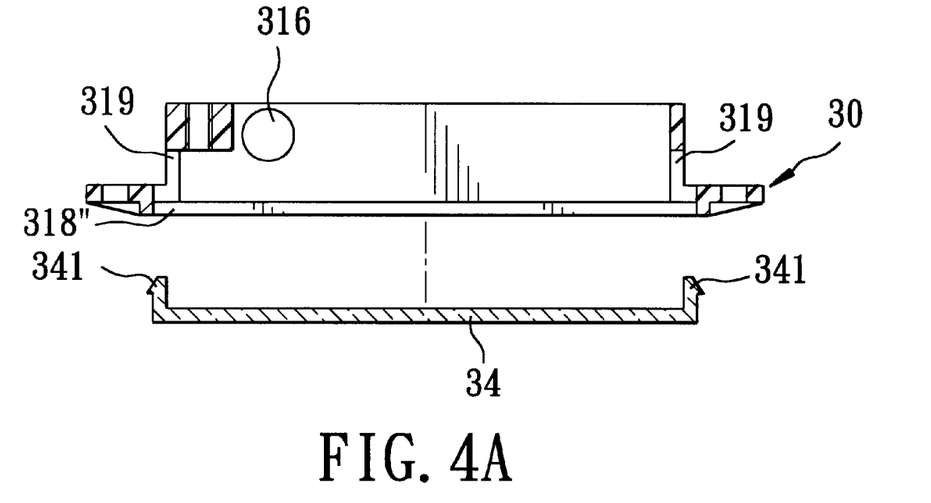
FIG. 4A is an exploded sectional view of a mounting member and a scale member of the preferred embodiment.
Figure 4B:
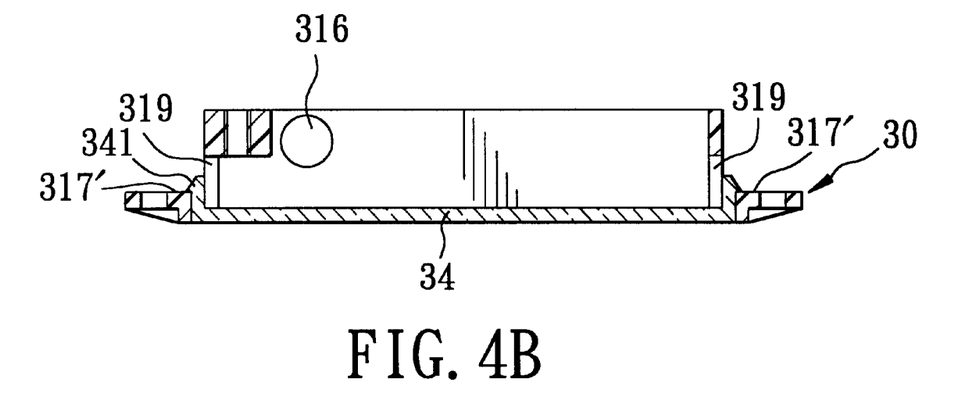
FIG. 4B is an assembled sectional view of the mounting member and the scale member of the preferred embodiment.
Figure 5:
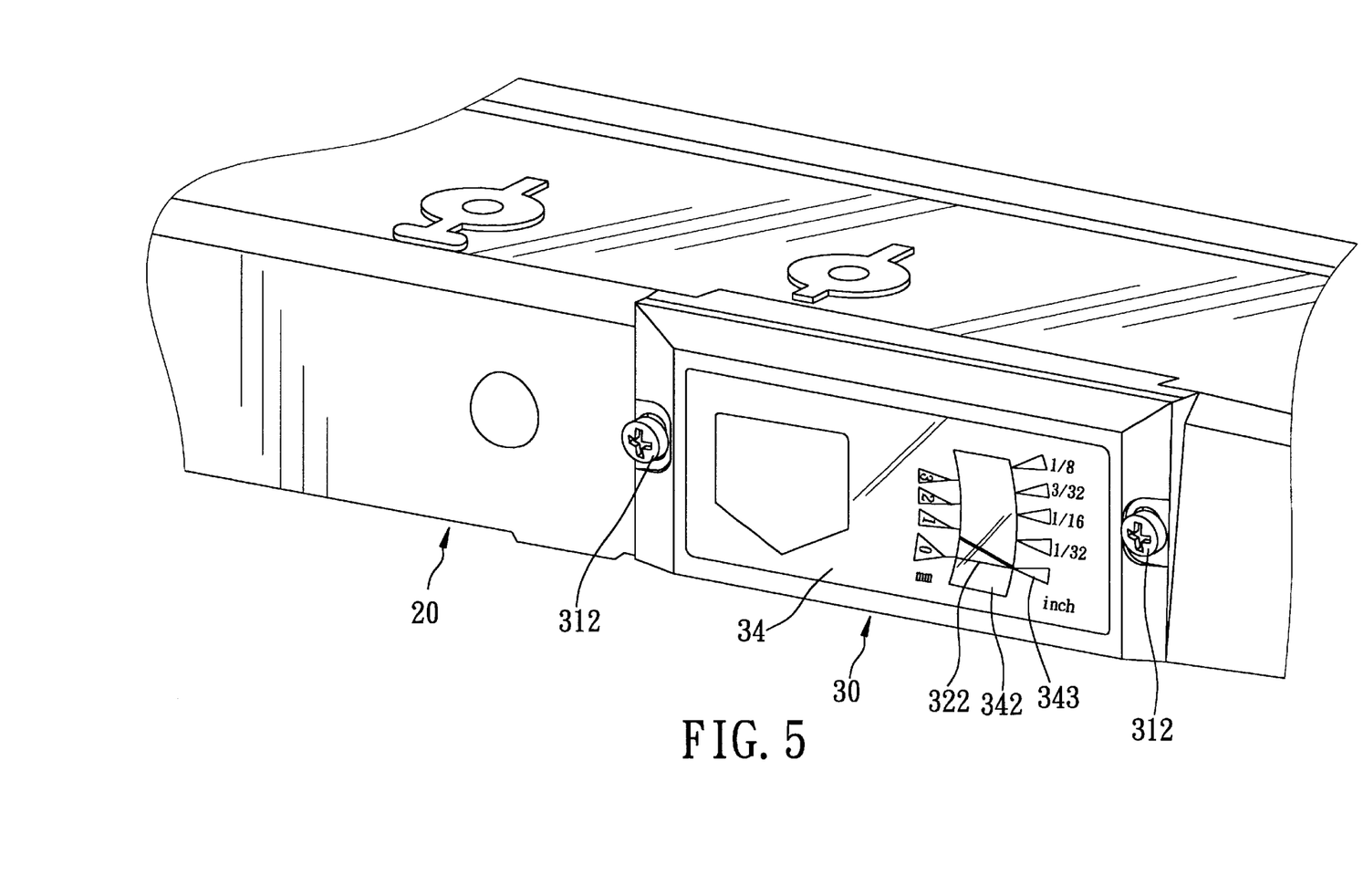
FIG. 5 is a fragmentary perspective view showing the preferred embodiment, which is disposed on a cutter seat of the wood-planing machine.
Figure 6:
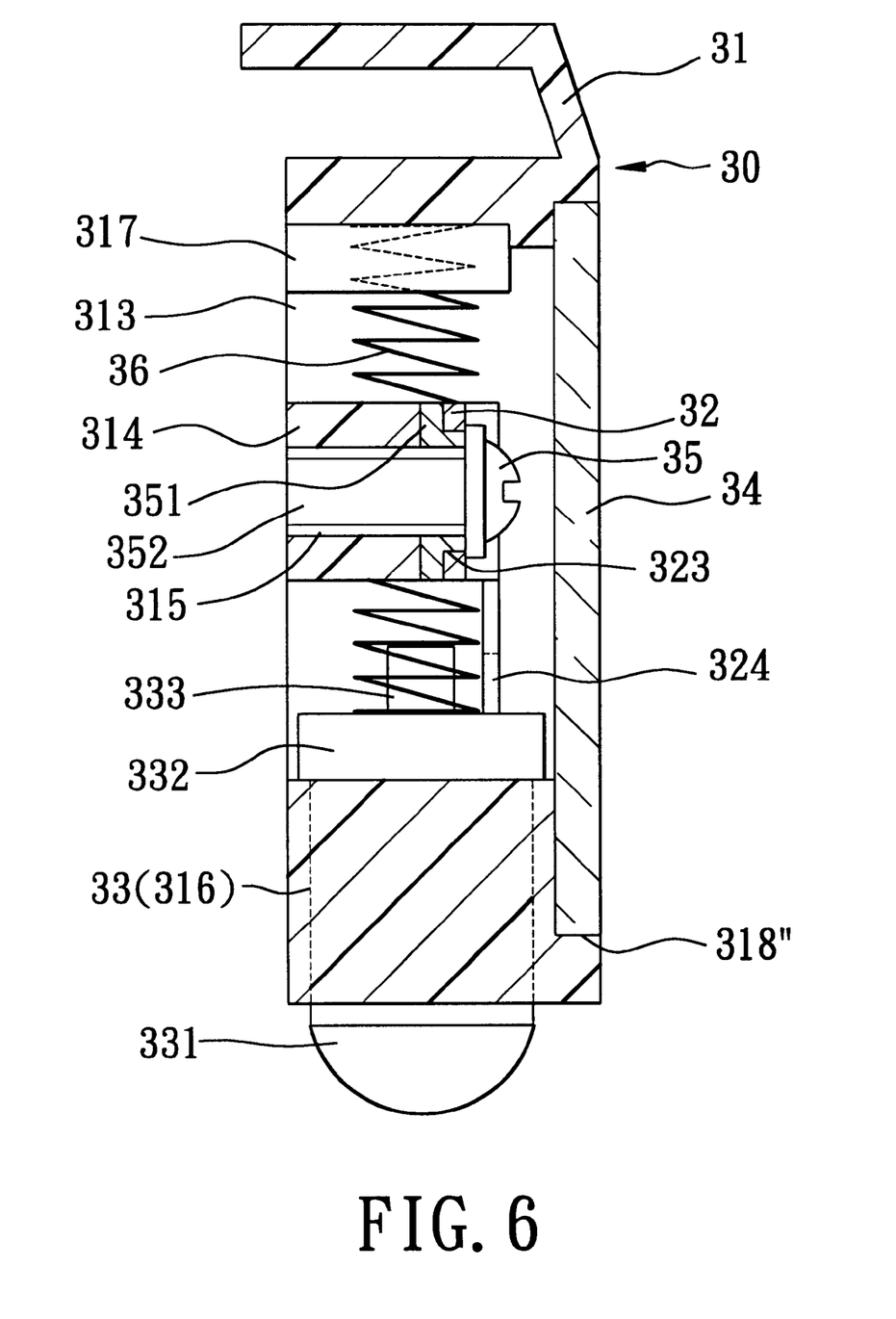
FIG. 6 is a sectional side view of the preferred embodiment.

Referring to FIGS. 4 and 6, the pushing rod 33 has a top surface, which is formed with an upwardly extending tongue 333, on which a lower end of the coil compression spring 36 is sleeved. The upper rail 310' is formed with two parallel ribs 317 that extend downward therefrom and that confine an upper end of the coiled compression spring 36 therebetween.

With this invention thus explained, it is apparent that numerous modifications and variations can be made without departing the scope and spirit of this invention. It is therefore intended that this invention be limited only as indicated by the appended claims.

I claim:

1. A thickness-indicating device for a wood-planing machine, the machine including a vertically movable cutter seat, said thickness-indicating device comprising:

a mounting member adapted to be disposed fixedly on the cutter seat;

a pointer having a connecting end that is mounted pivotally on said mounting member, an indicator end that is rotatable about said connecting end, and an abutment portion that is located between said connecting end and said indicator end;

a vertical pushing rod disposed vertically and movably on said mounting member and having an upper end which abuts against said abutment portion of said pointer, and a lower end which is adapted to abut against a top surface of a workpiece that is held on the machine;

a resilient member adapted to bias said lower end of said pushing rod to abut against the workpiece; and a scale member disposed fixedly on said mounting member near said indicator end of said pointer;

whereby, when the cutter seat and said mounting member move downward toward the workpiece, said pushing rod cannot move relative to the workpiece so as to rotate said pointer relative to said mounting member and said scale member, thereby indicating the thickness of the workpiece to be cut.

2. The thickness-indicating device as claimed in claim 1, wherein said lower end of said pushing rod is generally hemispherical so as to be adapted to reduce engaging surface area between said pushing rod and the workpiece, whereby, the workpiece can be moved smoothly relative to said pushing rod.

3. The thickness-indicating device as claimed in claim 1, wherein said mounting member is constructed as a rectangular frame, which has two side posts, an upper rail having two ends that are connected respectively and fixedly to upper ends of said posts, and a lower rail having two ends that are connected respectively and fixedly to lower ends of said posts so as to define a rectangular hole between said posts and between said upper and lower rails, said pointer being disposed within said rectangular hole, one of said posts being formed with an integral lug, which is located in said rectangular hole in said mounting member and which has a threaded hole, said device further including a stepped washer and a headed bolt that extends through said washer to engage said threaded hole in said lug of said mounting member and that has a head, said washer having a large-diameter washer portion which is proximate to said lug, and a small-diameter washer portion which is distal to said lug and which has an outer diameter smaller than that of said large-diameter washer portion, said connecting end of said pointer being formed with a hole therethrough, which engages said small-diameter washer portion so as to confine said pointer between said large-diameter washer portion and said head of said bolt, thereby connecting said pointer rotatably to said mounting member.

4. The thickness-indicating device as claimed in claim 3, wherein said scale member is shaped as a vertical rectangular plate, which is mounted removably on said mounting member and which covers said rectangular hole in said mounting member, said scale member having a curved slot formed therethrough, through which said indicator end of said pointer is visible, and an outer surface that is formed with a thickness-indicating mark unit, said indicator end of said pointer being directed toward said mark unit.

5. The thickness-indicating device as claimed in claim 4, wherein said mounting member has a vertical rearward face, an inverted U-shaped upper flange that extends inward from said upper rail and said posts, and a U-shaped lower flange that extends inward from said lower rail and said posts and that is disposed under said upper flange, each of said upper and lower flanges having two ends so as to define two notches between said ends of said upper and lower flanges, said scale member abutting against said upper and lower flanges and having an inner side surface, which is formed with two retaining barbs on two opposite sides that extend respectively through said notches, said barbs having bent end portions that extend away from each other and that abut against said vertical rearward face of said mounting member so as to retain said scale member on said upper and lower flanges, thereby confining said scale member within said rectangular hole in said mounting member.

6. The thickness-indicating device as claimed in claim 1, wherein said mounting member is constructed as a rectangular frame, which has two side posts, an upper rail having two ends that are connected respectively and fixedly to upper ends of said posts, and a lower rail having two ends that are connected respectively and fixedly to lower ends of said posts so as to define a rectangular hole between said posts and between said upper and lower rails, said lower rail being formed with a vertical rod hole therethrough, through which said pushing rod extends, said pushing rod having an upper end, which is formed with an integral outward flange that extends radially and outwardly therefrom and that has a diameter larger than that of said rod hole in said lower rail for preventing downward removal of said pushing rod from said rod hole in said lower rail, said resilient member being constructed as a coiled compression spring, which is confined between said pushing rod and said upper rail so as to bias said pushing rod away from said upper rail.

7. The thickness-indicating device as claimed in claim 6, wherein said pushing rod has a top surface, which is formed with an upwardly extending tongue, on which a lower end of said coiled compression spring is sleeved.

8. The thickness-indicating device as claimed in claim 6, wherein said upper rail is formed with two parallel ribs that extend downward therefrom and that confine an upper end of said coiled compression spring therebetween.

* * * * *